United States Patent [19]

Perraud

[11] 4,395,163

[45] Jul. 26, 1983

[54] MINING APPLIANCE

[75] Inventor: Raymond J. Perraud, Villeurbanne, France

[73] Assignee: Societe d'Etude et de Construction de Machines pour Toutes Industries S.E.C.O.M.A. S.A., Meyzieu, France

[21] Appl. No.: 199,683

[22] Filed: Oct. 22, 1980

[30] Foreign Application Priority Data

Oct. 26, 1979 [FR] France ............................ 79 27267

[51] Int. Cl.³ ........................................... E21C 11/02
[52] U.S. Cl. ..................................... 405/303; 175/219
[58] Field of Search .............. 405/303, 288, 291, 290; 175/219, 220; 173/22, 23

[56] References Cited

U.S. PATENT DOCUMENTS

| 3,259,211 | 7/1966 | Ryskamp . | |
| 3,472,550 | 10/1969 | Marco . | |
| 3,606,047 | 9/1971 | Schaeff . | |
| 3,784,159 | 1/1974 | Skattman et al. . | |
| 3,893,520 | 7/1975 | McCormick | 175/219 X |
| 3,951,215 | 4/1976 | Galis | 173/23 |
| 4,022,026 | 5/1977 | Childress . | |
| 4,026,118 | 5/1977 | McCay | 405/291 |
| 4,190,385 | 2/1980 | Childress | 405/303 X |
| 4,252,475 | 2/1981 | Cobb et al. | 405/291 |
| 4,297,057 | 10/1981 | O'Neil | 175/219 X |

FOREIGN PATENT DOCUMENTS

| 2602898 | 7/1976 | Fed. Rep. of Germany . |
| 1535960 | 9/1967 | France . |
| 1545123 | 11/1967 | France . |
| 2238017 | 7/1973 | France . |
| 2285498 | 6/1975 | France . |

Primary Examiner—Dennis L. Taylor
Attorney, Agent, or Firm—Karl F. Ross; Herbert Dubno

[57] ABSTRACT

A travelling mining appliance, particularly a travelling drilling and/or bolting appliance, having a protective roof. The appliance comprises a driving station used for controlling the movement of the appliance on the ground and a separate operating station, located on the side of the appliance, for controlling the drilling and/or bolting device. According to the invention, the roof is mounted to pivot on the appliance about a vertical axis. It is thus able to move in an angular manner between a first position in which it is located above and protects the driving station, without projecting beyond the width of the appliance and a second position in which projects beyond the side of the appliance and is located above the operating station thus protecting the operator who is standing opposite this station.

4 Claims, 5 Drawing Figures

MINING APPLIANCE

FIELD OF THE INVENTION

The present invention relates to a travelling mining appliance having a roof for protecting the operator and more particularly, but not exclusively, to a drilling and/or bolting appliance, comprising a driving station, used for controlling the movement of the appliance on the ground and a separate operating station, located on the side of the appliance, for controlling the drilling and/or bolting device. Thus the invention relates essentially to safety equipment intended for appliances used for the mechanized bolting of the roof of a mine level or tunnels (gallery).

BACKGROUND OF THE INVENTION

Owing to the actual function of these appliances, which is to position the support for the roof of a mine level, the latter operate in a dangerous area and consequently attempts have been made to keep the operator at a distance from the dangerous area, by automation of the bolting operations. However one condition to be fulfilled is that the operator, kept at a distance in this way, maintains good visibility in the direction of the drilling and/or bolting device.

Bolting appliances are known having a single central driving station, used both for controlling the movement of the appliance on the ground and for controlling the drilling and/or bolting device. A roof for protecting the operator is sometimes provided on these appliances, which roof is stationary and located above the driving station. However, in view of the above mentioned requirements as regards visibility, this design cannot be used universally:

On one hand, the roof must be sufficiently high in order that the operator is able to work in an upright position, so that the arrangement of the appliance in question is suitable solely for working in mine levels of sufficient height.

On the other hand, the solution of the central driving station is in practice reserved for appliances provided with two symmetrical lateral arms supporting the drilling and/or bolting devices.

In other cases, i.e. for mine levels of limited height and where the appliances are provided with a single central arm, another design is preferred, with a driving station directed towards the front for controlling the movement of the appliance on the ground and an operating station on the side, for controlling the drilling and/or bolting device. The driving station, located between the front and rear wheels of the appliance, comprises the steering wheel and the other controls necessary for the movement of the appliance on the ground. The operating station, located on the side of the appliance in front of the driving station, enables the operator to control the drilling and/or bolting device while standing on the ground beside the appliance, which gives him good visibility for controlling the operations.

Mining appliances with a double station, the arrangement of which has just been discussed, in certain cases have a protective roof solely over the driving station. The operating station is not protected and it will be understood that it cannot be protected by means of a stationary device, since this device would project over the side of the appliance and would increase the width of the latter thus impeding its movement on the ground. Thus, the operator is not protected against falling pieces of rock when he is stood at the side of the appliance for controlling drilling and/or bolting and this constitutes a serious omission in the safety precautions.

OBJECT OF THE INVENTION

The present invention intends to remedy all these drawbacks by providing, for appliances in which the driving station is separate from the operating station, safety equipment capable of protecting the operator without impairing visibility and without increasing the travel dimensions of the appliance as regards height or width.

SUMMARY OF THE INVENTION

According to the present invention there is provided a travelling mining appliance having a roof for protecting an operator of the appliance, the appliance comprising a driving station, for controlling the movement of the appliance on the ground, and a separate operating station located on the side of the appliance for controlling an operating function of the appliance wherein the roof is mounted to pivot on the appliance about a substantially vertical axis and is able to move in an angular manner between a first position in which it is located above the driving station without exceeding the width of the appliance and a second position in which it projects beyond the side of the appliance and is located above the operating station, the passage of the roof from one position to the other taking place by a rotation of the order of 90° about said vertical axis.

Thus, the basic idea of the invention consists of providing a pivoting protective roof ensuring the safety of the operator under all conditions in which the appliance is used. When the appliance is moved on the ground, the roof is placed above the driving station, a position in which it is located within the overall dimensions of the appliance. When the appliance is used for drilling and/or bolting, the roof is placed above the operating station and the area occupied by the operator, who stands beside the appliance, facing the operating station. Advantageously a retractable leg for resting on the ground is mounted on this pivoting roof, this leg making it possible to immobilize the roof in its position protecting the operating station. Other means may be provided for immobilizing the roof in its position protecting the driving station. For the passage of the roof from one position to the other, which represents a rotation of the order of 90° about the vertical pivot axis, it is possible to provide a control jack pivoted at one end to a fixed point of the appliance and at the other end to said roof.

According to another feature, the pivoting protective roof according to the invention comprises a part located in a substantially horizontal plane and a part located in a substantially vertical plane, remote from the pivot point of the roof, in order to ensure protection not only above but also behind the operator, both at the driving station and at the operating station. Advantageously, the roof is constituted by a frame supporting latticed parts, located above and behind the operator, in order to ensure safety while providing the maximum degree of visibility, both to the rear for driving the appliance on the ground and upwards for controlling drilling and/or bolting of a mine level ceiling. Preferably, the latticed part of the roof located above the operator is constituted by an arrangement of transverse strips, the inclinations of which are variable from one strip to another and are such that the planes of the different strips converge. By providing that these planes converge substantially at the point where the operator's eyes are located, one obtains very good upward visibility, through the upper part of the roof. As for the rear part of the roof, this may be constituted by a simple reinforced grating.

Finally, if the basic idea of the present invention resides in a pivoting roof, which is able to be moved angularly between a position protecting the driving station and a position protecting the operating station, an advantageous variation consists of suspending a complete cabin for driving and controlling the appliance from this pivoting roof.

BRIEF DESCRIPTION OF THE DRAWING

Nevertheless, the invention will be better understood from the ensuing description, referring to the accompanying diagrammatic drawing illustrating, as a non-limiting example, one embodiment of this pivoting protective roof for mining appliances. In the drawing.

SPECIFIC DESCRIPTION

Figure 1:
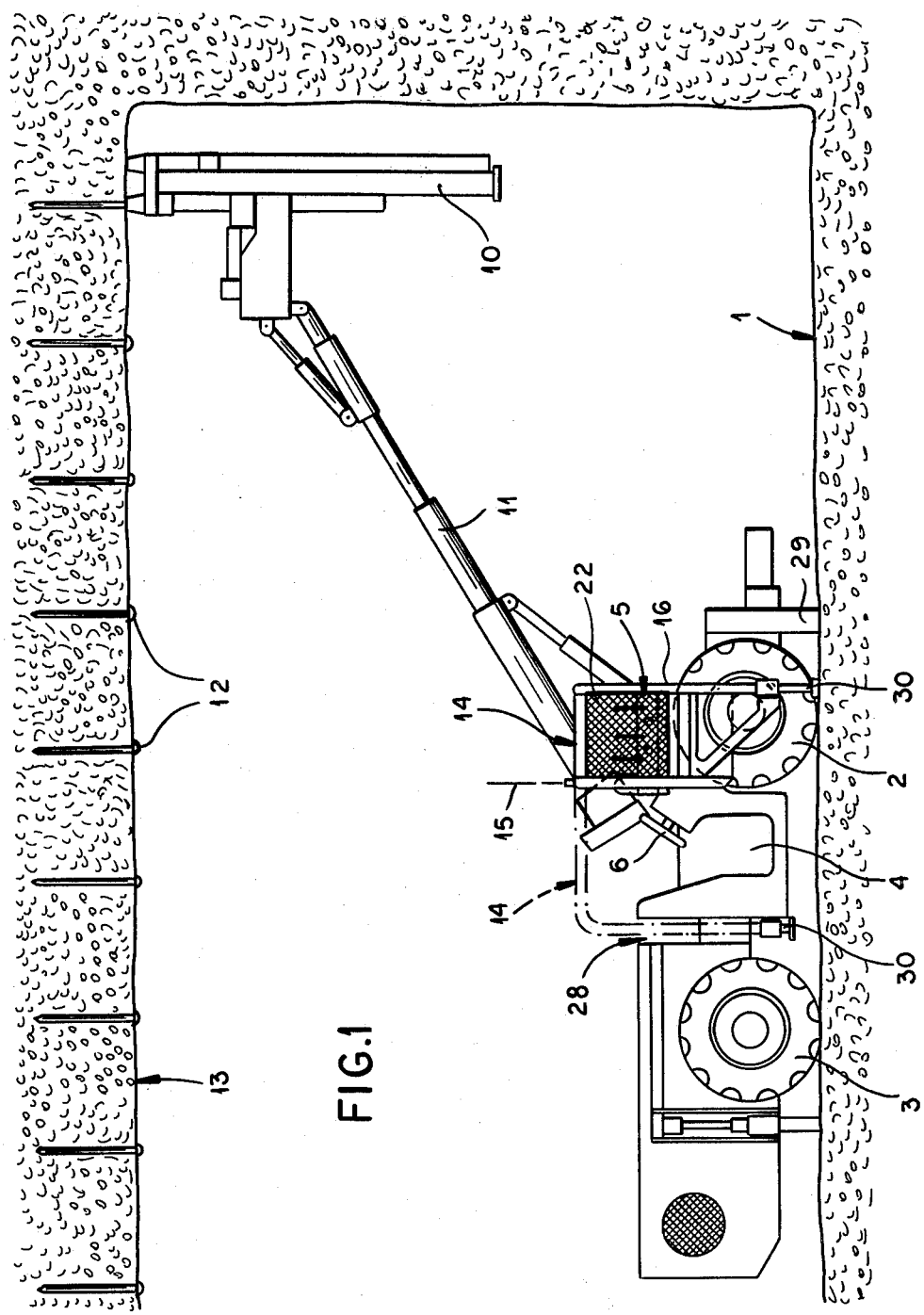
FIG. 1 is a side view of an appliance equipped with the pivoting roof according to the invention, showing two positions of this roof.
Figure 2:
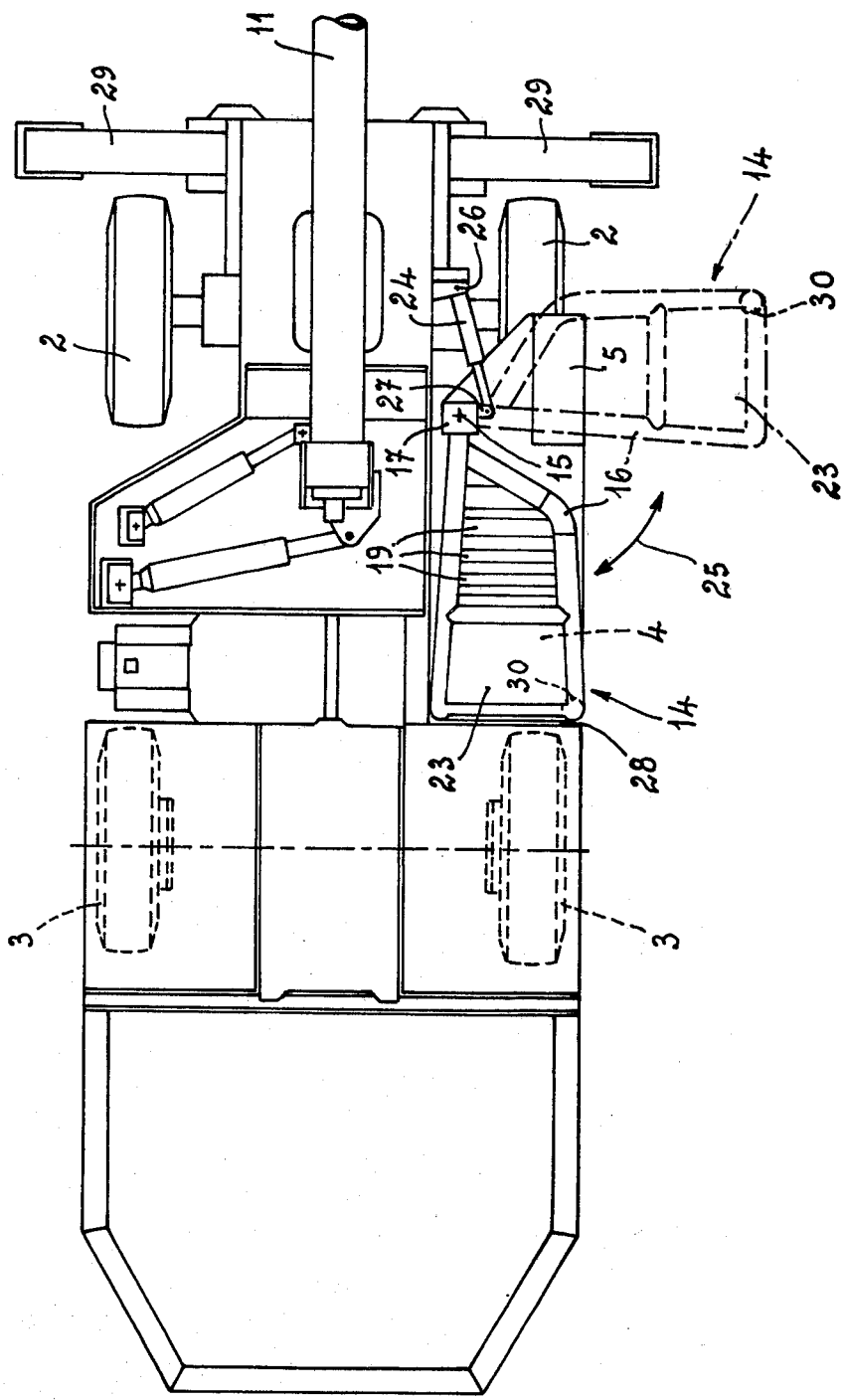
FIG. 2 is a plan view of this appliance, to an enlarged scale, also showing the two positions of the pivoting roof.

FIGS. 1 and 2 show a mining appliance travelling on the ground 1 of a mine level with two front wheels 2 and two rear wheels 3, the structure of the "vehicle" part of this appliance being well known and thus not described in detail. This appliance comprises a driving station 4 and an operating station 5. The driving station 4 is located between the front wheels 2 and rear wheels 3 of the appliance and it is accessible from the right-hand side of this appliance. It serves to control the movement of the appliance on the ground and to this end it comprises the steering wheel 6 as well as the other controls 7 (see FIG. 3). The operating station 5 is located in front of the driving station 4, on the side of the appliance and more precisely, in the example illustrated, above the right-hand front wheel 2. This operating station comprises levers 8 as well as control instruments 9 (see FIG. 3), enabling the operator, who is standing on the ground 1 beside the appliance, to control the various operations of a drilling and bolting turret 10, supported by a central swivelling arm 11 which is intended for the mechanical introduction of bolts 12 into the ceiling 13 of the minelevel.

According to the invention, the appliance in question is equipped with a protective roof 14 mounted to pivot about a vertical axis 15 located in front of the driving station 4.

Figure 3:
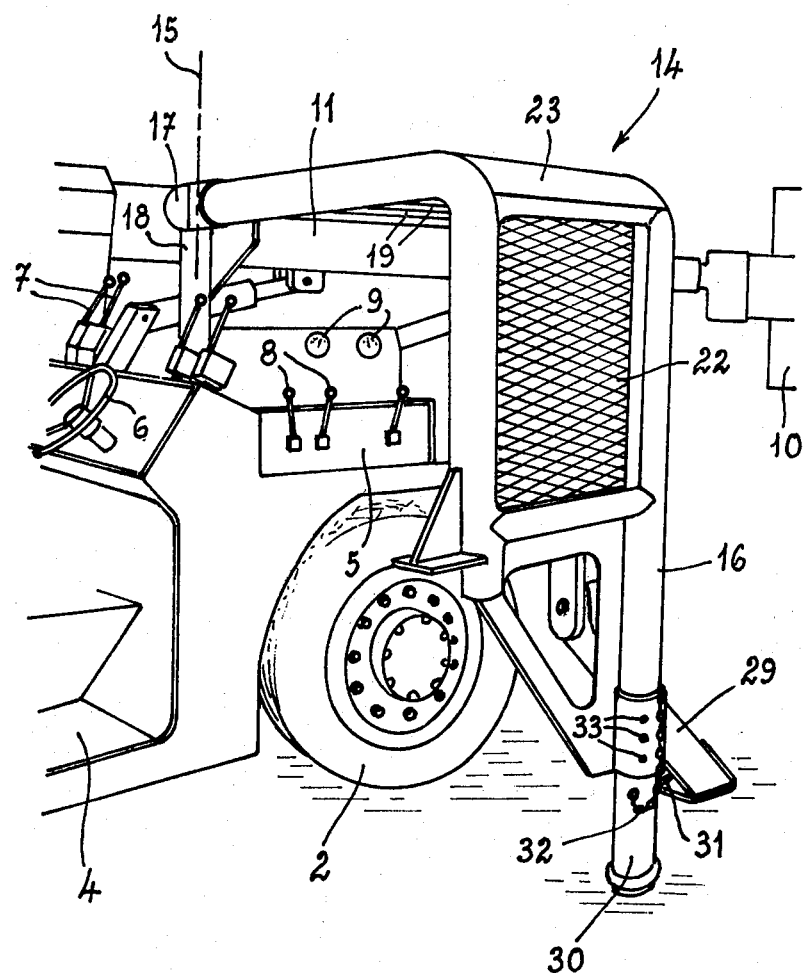
FIG. 3 is a partial perspective view of the same appliance, showing the pivoting roof in its position protecting the operating station.
Figure 4:
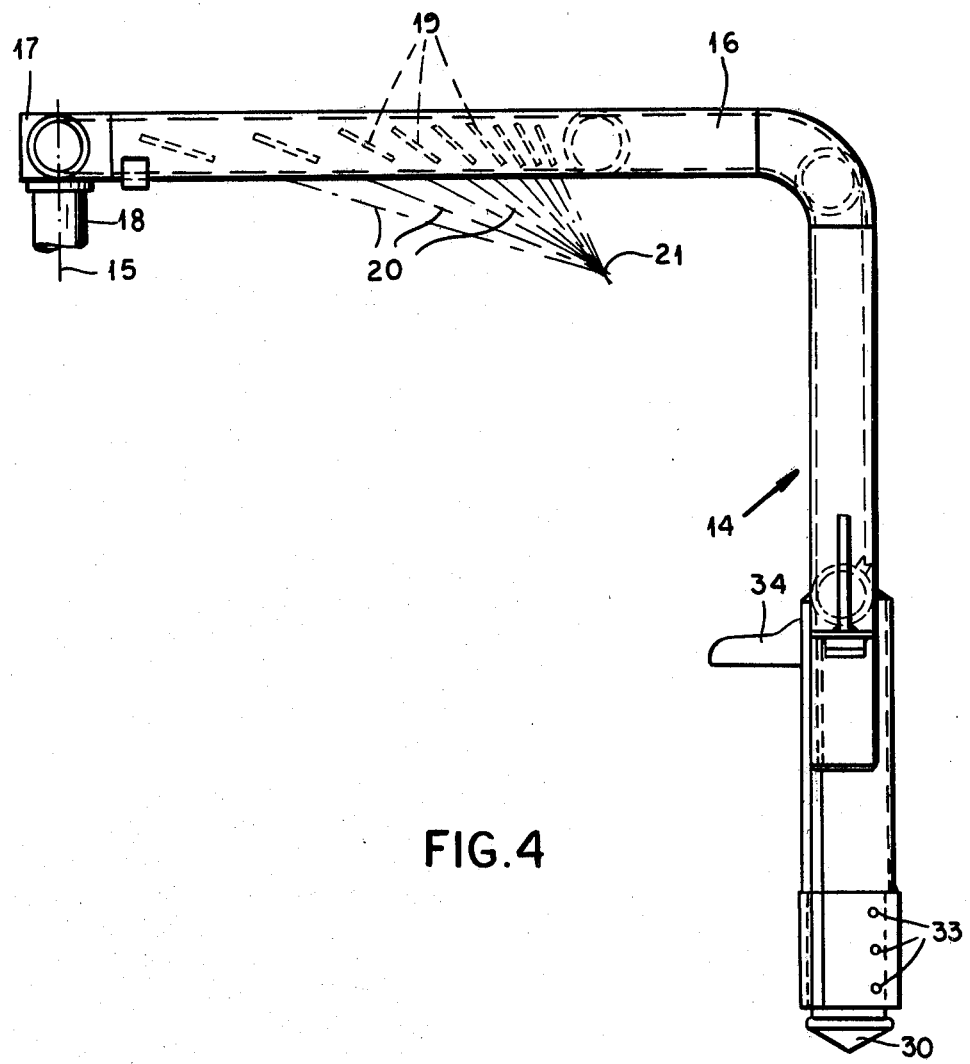
FIG. 4 is a side view solely of the roof, showing details of the latter.
Figure 5:
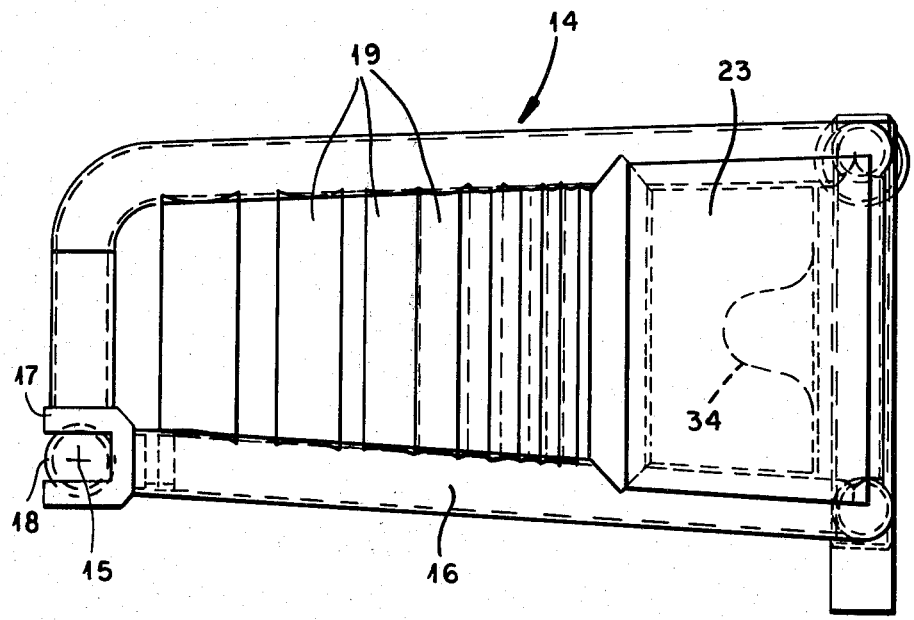
FIG. 5 is a plan view solely of the roof, corresponding to FIG. 4.

This protective roof 14, the detailed structure of which is shown in FIGS. 3 to 5, comprises a tubular frame 16. It comprises a substantially horizontal upper part to which is fixed a part 17 mounted at the top of a post 18. Remote from the pivot axis 15, the upper part of the roof is extended by a rear part, extending vertically downwards towards the ground 1.

As shown more particularly in FIG. 4, the upper part of the pivoting roof 14 is latticed and to this end is constituted by an arrangement of transverse strips 19 connecting the two side members of the frame 16. The inclinations of the strips 19 vary from one to the other and are such that the planes 20 of these strips 19 all converge in a horizontal straight line 21.

The rear part of the pivoting roof 14, which is also perforated, may be constituted by a simple reinforced grating 22, forming a rectangular panel surrounded by the frame 16 as shown in FIG. 3. A protective plate 23 ensures complete closure of the roof between the upper strips 19 and the grating 22.

A jack 24 which is shown in FIG. 2, is provided for controlling the rotation of the roof 14 about its pivot axis 15, in the direction of arrow 25. This jack 24 is pivoted at one end to a fixed point 26 of the appliance, at the other end to a lug 27 integral with the lower part of the post 18 and it is supplied with power and controlled by known means. The post 18 rotates in bearings, not shown in the drawing, supported by parts of the chassis of the appliance.

By means of the jack 24, the pivoting roof 14 may be brought into a first position where it ensures protection of the driving station 4 and, therefore, protection of the operator when the latter controls the movement of the appliance on the ground. In this first position (shown in dot dash line in FIG. 1 and in solid line in FIG. 2), the upper part of the roof 14 is above the driving station 4 and the rear part of the roof fits in an empty space 28 provided behind the driving station 4. Therefore the roof 14 does not exceed the width of the appliance.

By a pivotal movement of the roof 14 through 90°, controlled by the jack 24, this roof may be brought into a second position where it ensures protection of the operating station 5, thus the protection of the operator when the latter controls the turret 10. In this second position (shown in solid line in FIG. 1 and in dot dash line in FIG. 2, but above all illustrated by FIG. 3), the upper part of the roof 14 is located above the operating station 5 as well as the operator, who is standing opposite this station, whereas the rear part of the roof, with the grating 22, is located behind the operator. The roof 14 thus projects beyond the side of the appliance, but this does not constitute a drawback since the appliance is thus immobilized with respect to the ground 1, by means of stabilizers 29 which in any case themselves extend beyond the overall dimensions of the appliance.

In order to prevent the pivoting roof 14 from rotating, in the position protecting the operating station 5 described above, the lowermost part of the frame 16 comprises a support leg 30, resting freely on the ground 1. When the roof 14 is once more placed above the driving station 4, the leg 30 is retracted into the frame 16 and held in its raised position by means of a cotter pin 31, suspended from a short chain 32 and introduced through holes 33 (see FIG. 3).

The pivoting roof 14, described previously, ensures the safety of the operator at the driving station 4 or at the operating station 5, depending on his position, by providing protection both above and at the rear of the operator and without impairing his visibility. In this respect, in particular it will be noted that the arrangement of the strips 19 provides excellent visibility in an upwards direction, thus in the working region of the turret 10.

The pivoting roof according to the invention has been described above in the case of its application to an appliance equipped with a drilling and bolting turret, designed for introducing bolts into the roof of a mine-level, but it is obvious that the invention is not limited to this single application and retains its advantage for example for a mining appliance equipped solely with a drilling device, operating along a substantially horizontal axis.

Naturally and as is apparent from the aforesaid, the invention is not limited to the single embodiment of this pivoting protective roof for a mining appliance which has been described above, by way of example. On the contrary, it includes all variations carried out according to the same principle, whatever the details and additional arrangements. Thus, in particular, the term "roof", given to the safety equipment which is the object of the invention, does not prevent the latter from being completed for example by side panels, and does not prevent the latter from serving as a support for a real pivoting driving and control cab, in some way suspended from said roof, which goes some way towards providing maximum protection for the operator. Within the same framework of ideas, without providing a true pivoting cab, one could also provide that the rear part of the pivoting roof 14 according to the invention supports a mini seat 34 (see FIGS. 4 and 5), allowing the operator to assume a semi-sitting position at the operating station 5, i.e. for controlling drilling and/or bolting.

What is claimed is:

1. In a traveling mining machine with an internal driving station for controlling the movement of the machine, an operating station located on a side of said machine, and a tool controlled by the operating station, the improvement which comprises:
    a cab including a substantially horizontal canopy formed with openings enabling an operator to observe an area above said canopy, a substantially vertical shield extending downwardly along one edge of said canopy, and a seat on said vertical shield; and
    means defining a vertical pivot axis for said cab at a corner of said canopy remote from said shield whereby said cab is integrally swingable from an internal position wherein said canopy forms the sole roof for said driving station to an external position wherein said shield covers and protects said operating station and extends downwardly behind an operator working said tool from said operating station.

2. The improvement defined in claim 1 further comprising a ground engageable retractable leg at a lower end of said shield most distal from said vertal axis for immobilizing said cab in its position protecting said operating station.

3. The improvement defined in claim 1 wherein said cab is constituted by a frame supporting perforated wall sections.

4. The improvement defined in claim 3 wherein said openings are defined by inclined transverse strips with the inclinations differing from one to another such that the planes of the strips converge towards said seat.

* * * * *